(12) United States Patent  
Klein

(10) Patent No.: US 7,168,726 B2
(45) Date of Patent: Jan. 30, 2007

(54) ULTRA LIGHTWEIGHT, HIGH EFFICIENCY BICYCLE SUSPENSION

(75) Inventor: Gary Klein, Chehalis, WA (US)

(73) Assignee: Trek Bicycle Corporation, Waterloo, WI (US)

( * ) Notice: Subject to any disclaimer, the term of this patent is extended or adjusted under 35 U.S.C. 154(b) by 147 days.

(21) Appl. No.: 10/755,219

(22) Filed: Jan. 12, 2004

(65) Prior Publication Data

US 2004/0145148 A1 Jul. 29, 2004

(51) Int. Cl.
*B62D 3/02* (2006.01)

(52) U.S. Cl. ..................................................... 280/284

(58) Field of Classification Search ................ 280/284, 280/285, 286, 784; 248/580, 581, 583, 602, 248/608, 609, 613
See application file for complete search history.

(56) References Cited

U.S. PATENT DOCUMENTS

| | | | | |
|---|---|---|---|---|
| 2,283,671 A | * | 5/1942 | Finlay et al. ................ | 280/284 |
| 4,421,337 A | * | 12/1983 | Pratt .......................... | 280/277 |
| 5,098,114 A | * | 3/1992 | Jones ......................... | 280/284 |
| 5,125,678 A | * | 6/1992 | Bogen ........................ | 280/278 |
| 5,209,508 A | * | 5/1993 | Lennon ...................... | 280/261 |
| 5,217,241 A | * | 6/1993 | Girvin ........................ | 280/284 |
| 5,367,918 A | | 11/1994 | Chang et al. | |
| 5,405,159 A | * | 4/1995 | Klein et al. ................. | 280/283 |
| 5,460,396 A | * | 10/1995 | Sutter et al. ................ | 280/284 |
| 5,496,052 A | * | 3/1996 | Tamaishi ..................... | 280/284 |
| 5,570,896 A | * | 11/1996 | Collins ....................... | 280/284 |
| D380,990 S | | 7/1997 | Chien | |
| 5,685,553 A | * | 11/1997 | Wilcox et al. .............. | 280/283 |
| 6,056,307 A | * | 5/2000 | Busby et al. ............... | 280/284 |
| 6,099,010 A | * | 8/2000 | Busby ........................ | 280/284 |
| 6,406,048 B1 | * | 6/2002 | Castellano .................. | 280/284 |
| 2002/0063410 A1 | * | 5/2002 | Buckmiller et al. ........ | 280/274 |
| 2005/0151344 A1 | * | 7/2005 | Parkin ........................ | 280/284 |

FOREIGN PATENT DOCUMENTS

EP 1352822 10/2003

* cited by examiner

*Primary Examiner*—Lesley D. Morris
*Assistant Examiner*—Daniel Yeagley
(74) *Attorney, Agent, or Firm*—Barnes & Thornburg LLP; David C. Brezina

(57) ABSTRACT

A rear suspension road bicycle frame uses an integrated rear shock absorbing assembly installed in a typical diamond bicycle frame with a head tube, down tube, top tube, seat tube, tubular chainstays, tubular seat stays, brake bridge at the top of the seat stays connecting them, the shock absorbing assembly having an elastomer shock absorbing spring member with a slide affixed to the brake bridge, and a sliding bearing in the upper wishbone so that the preloaded spring member absorbs shock and the frame absorbs flexing tending to unload the spring member.

19 Claims, 3 Drawing Sheets

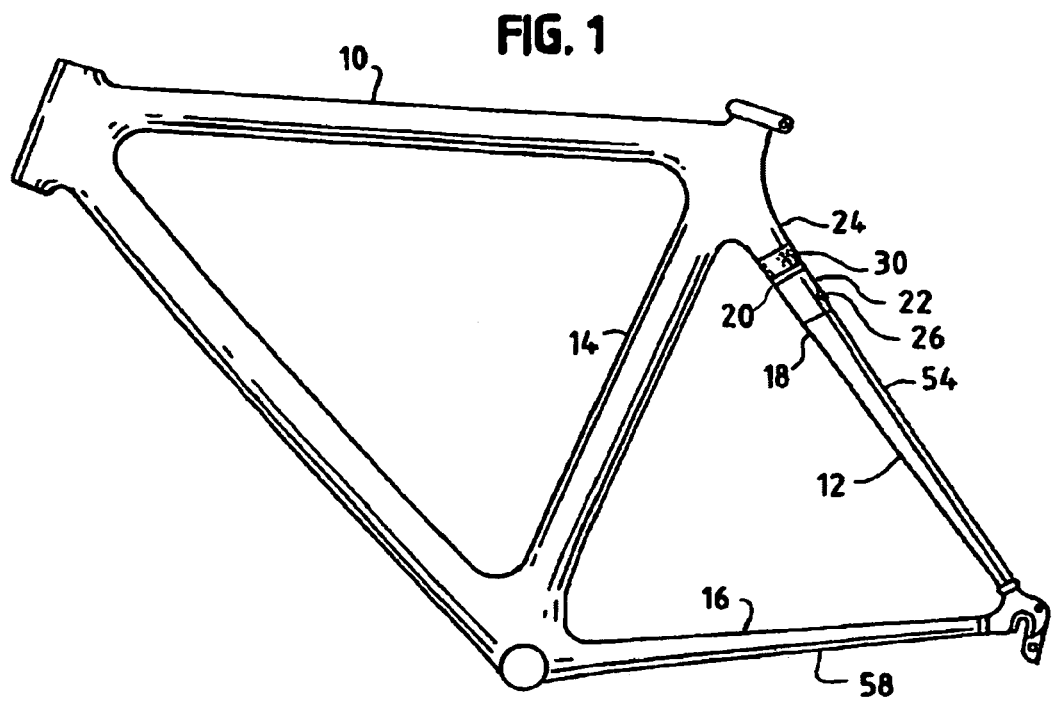
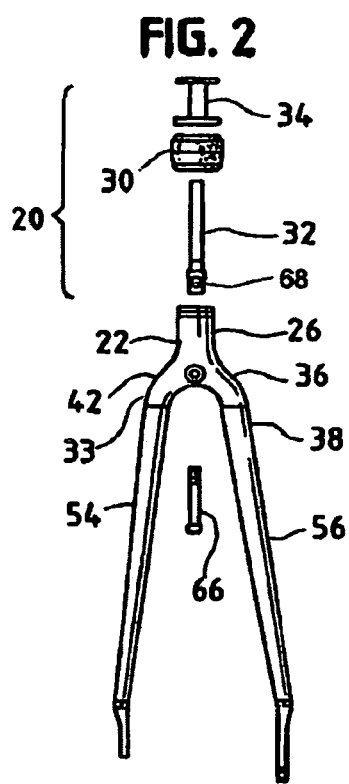
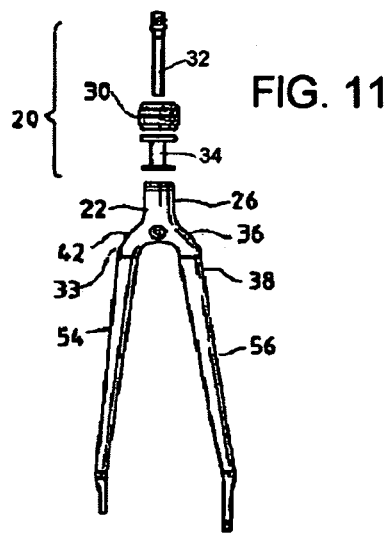
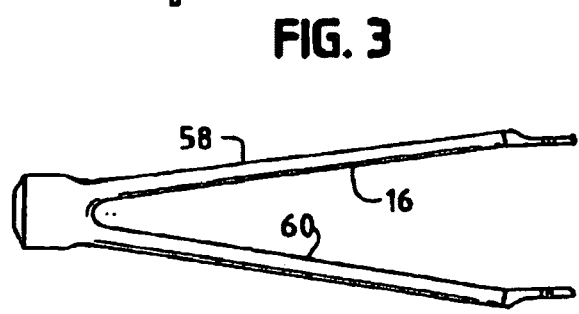

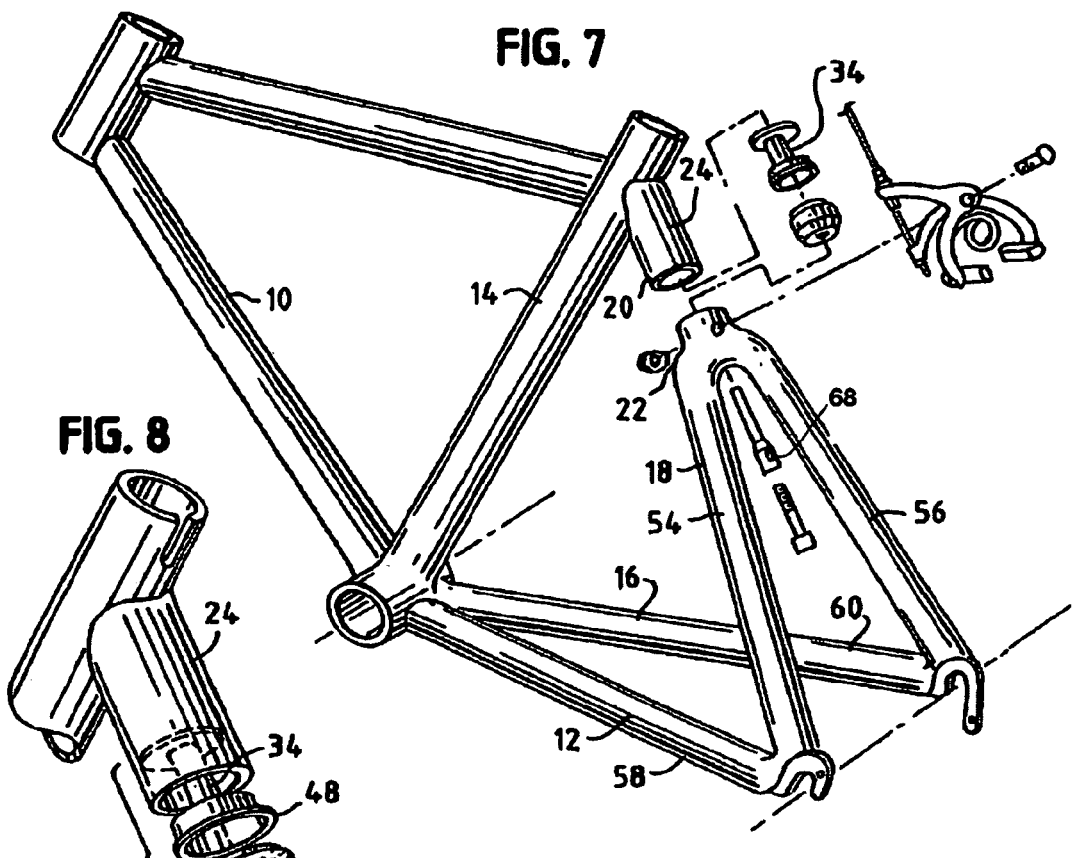
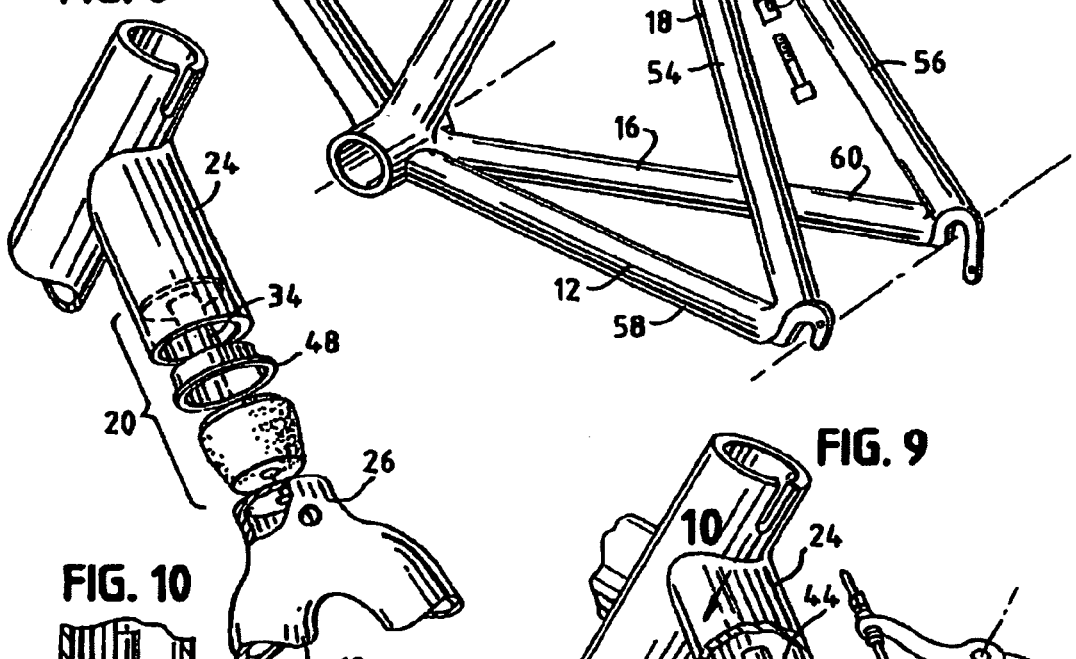
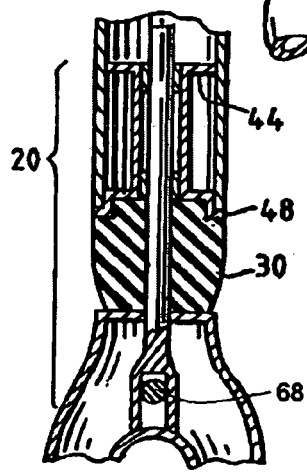
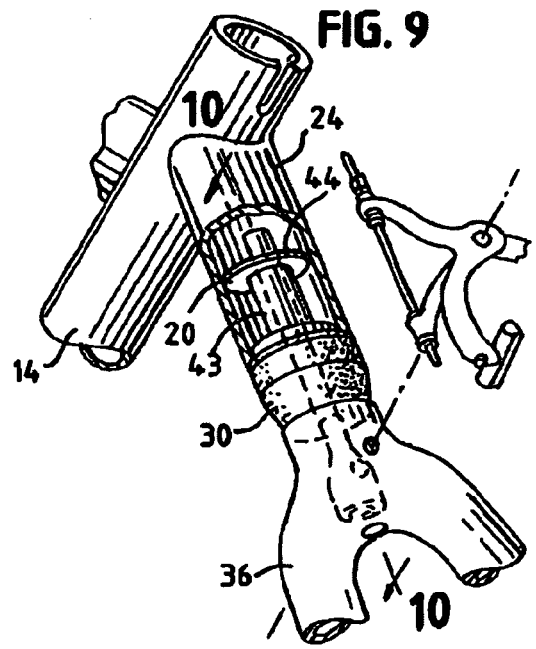

ULTRA LIGHTWEIGHT, HIGH EFFICIENCY BICYCLE SUSPENSION

BACKGROUND OF THE INVENTION

1. Field of the Invention

The invention is a rear suspension design which can be incorporated into light weight racing frames such as are used by professional racing teams.

2. Summary of the Invention

Professional racing teams race some extremely rough courses including many sections paved with cobblestones. These can be extremely fatiguing and dangerous to the riders, causing many instances of loss of control of the bike and resultant crashes. For example, one race that is famous for the amount of rough surface conditions is the Paris-Roubaix.

These races can be very damaging to the riders and their equipment. They will sometimes use larger diameter tires than on normal courses in order to provide a little more cushion and more resistance to flatting on the harsh bumps. The drawback is that additional mass on the bike degrades its performance in several ways and the larger tires typically add additional weight to the bike. In addition, the road racing bike frames are typically made so as to be very close to the narrow racing tires. So it is usually possible to only put a slightly larger tire on. There usually is not clearance for a substantially larger tire. The side pull type brakes that road racing bikes use also preclude a much larger tire. They do not have adequate reach adjustment or tire clearance to fit larger road tires. So even if you designed more tire clearance into a frame, it would not be able to use this type of brake.

It is possible to use a different type of bike called a cyclo-cross type which does allow the use of significantly larger tires. These bikes are intended for off road use and utilize a different type of braking system called cantilevers which allow for a larger tire. So on these bikes the frame and the brakes have more clearance for larger tires.

But most of the road racing teams like to stay on their road racing bikes, even for the rougher road conditions. They are used to the fit and handling of their personal bike and don't like to change the type of bike.

In addition to the fatigue, the rough courses cause substantial loss of energy to the bumps and result in significantly lower bike speeds than the similar amount of effort on a smooth course would achieve. The vertical up and down motion which is beating up the rider and causing loss of wheel traction comes out of the pedaling energy supplied by the rider.

Some road racing teams have used front suspension forks on these rougher courses. These forks are typically add at least 1 kilogram of mass to the bike. This is a large amount of weight to add and a considerable detriment to the bikes performance on a moderate to smooth road. As they have a significant amount of stiction, the static friction resulting from the sliding seals and bearings which must be overcome before the suspension can begin to move, they are only partially effective at attenuating the front wheel shocks. They provide noticeable cushioning of the hands of the rider, but not much for the saddle or feet, where most of the riders weight is. Most of the weight of the cyclist, and the all of the cyclists forward driving force is located at the rear wheel. So suspension and better traction is likely to be at least, if not more useful on the rear than on the front wheel. In addition, the sliding type front forks have a tendency to move up and down with each pedal stroke, unless the stiction is high enough to prevent it. This motion wastes the rider's energy. But higher stiction reduces the amount of road shock that the front fork attenuates.

This is especially evident in a sprint, when the pedaling forces are larger, so the weight shift from front wheel to rear wheel with each pedal stroke is greater, and more of the riders weight is moved forward to the front wheel as he leans forward or stands up. As a result, the use of front suspension forks in these types of events has had very limited success.

The invention is intended to attenuate the amplitude of deflections that the rider feels, both in the feet and seat. This will reduce fatigue in the rider, especially over a longer course. The invention is further intended to improve the adhesion of the tires to the pavement, by reducing the amount of time they are not in contact with the road surface and reducing the variation or amplitude of forces between the tire and the ground.

The invention provides a limited amount of very supple rear wheel suspension travel, about 1 to 1.8 cm in the preferred configuration, while retaining the light weight of the some of the lightest professional level bicycle racing frames, and retaining sufficient structural rigidity to control the out-of-plane deflection of the overall frame and the rear wheel of the bike which lead to loss of efficiency and control of the bike.

The invention is adaptable to be used in a variety of bicycle frames including molded fiber reinforced plastic frame such as FIG. 1-3, or a metal frame, such as the welded and heat treated aluminum type of frame as shown in FIG. 7-10. One of ordinary skill in the art will understand that the invention can be adapted regardless of the particular frame material, whether fiber reinforced plastic, metal such as steel, aluminum or Titanium, or a combination of materials. Similarly, one of ordinary skill will be able to adapt component mounting such as the brake fixing nut which also retains the shock.

3. Description of Related Art

Some of the prior art suspension designs used curved seatstays. The bend(s) destabilize the seat stay tubes, and cause it to flex more when an axial load is applied, either by the riders weight or by a momentary bump impact. Unfortunately, the bends also greatly reduce the capability of a given tube to support an axial load. Thus, the bent seat stays must be made heavier than normal to provide adequate frame structure. One design uses a single large radius bend in the seatstays, but the amount of flex under compression is limited by a layer of polymer and a stainless steel strap under tension. This of course adds considerable weight to the overall structure, while providing less benefit than the current invention.

Prior art devices either used mechanical pivots to allow the rear wheel to move vertically with respect to the rest of the frame and the rider, or they utilized very vertically flexible members for the chainstays, for example, in order to allow a large amount of deflection from their resting position. Some of these have metal chainstays but which have been reinforced and flattened horizontally so they are not stiff in the vertical direction, but still torsionally and laterally rigid. Or they have had sections of the chainstay where the metal is replaced by a flat fiberglass spring, for example.

U.S. Pat. No. 6,406,048 issued to Castellano on Jun. 18, 2002. This patent is entitled "Pivotless Rear Suspension System For Bicycles". According to Castellano, utilization of tubular type chainstays precludes a useful amount of suspension travel. Castellano further states that the alignment between the upper and lower portions of the wishbone must be free to move angularly in order to allow operation of the particular shock arrangement of the '048 patent. This patent is incorporated by reference.

Adding pivots or reinforcing and substantially reshaping the chainstays, or adding flat springs to the chainstays all typically add weight to the bike. And since the resultant structure is not very rigid vertically, in order to take a large deflection in one direction for many cycles without fatigue, the compressive spring must be designed to take most of the compressive loads, making it heavier. There also needs to be a negative spring and mechanism for activating it included in these designs, which again adds weight and complexity.

BRIEF DESCRIPTION OF THE DRAWINGS

FIG. 1 is a side elevation of the bicycle frame of the invention.

FIG. 2 is a exploded view of the seat stay and shock absorber assembly of the invention.

FIG. 3 is a bottom plan view of the chain stay and bottom bracket assembly of the invention.

FIG. 7 is a perspective view of the frame with an exploded view of the shock absorber assembly.

FIG. 8 is a fragmentary perspective view of the seat lug portion of the frame and the seatstay assembly with the shock absorber assembly in place.

FIG. 9 is a fragmentary perspective view of the upper monostay portion of the frame and the seatstay assembly with the shock absorber assembly in place.

FIG. 10 is a sectional view of the frame with the shock absorber assembly in place.

FIG. 11 is a exploded view of an alternative embodiment of the seat stay and shock absorber assembly of the invention.

DETAILED DESCRIPTION OF THE PREFERRED EMBODIMENT

Figure 4:
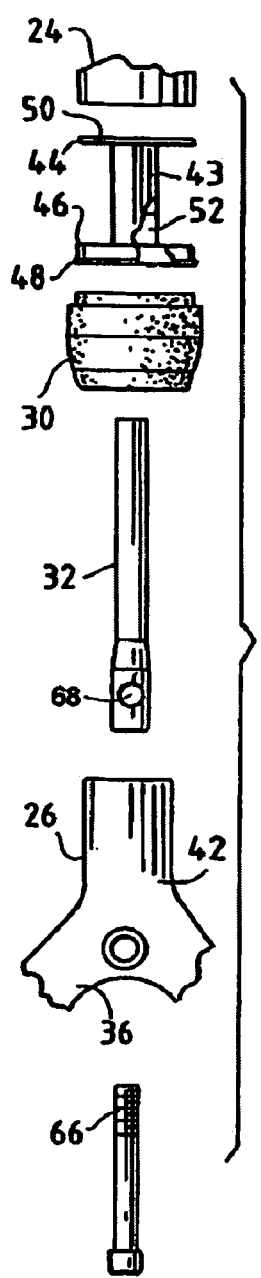
FIG. 4 is an enlarged exploded view of a portion of the seat stay yoke and shock absorber assembly of the invention.
Figure 5:
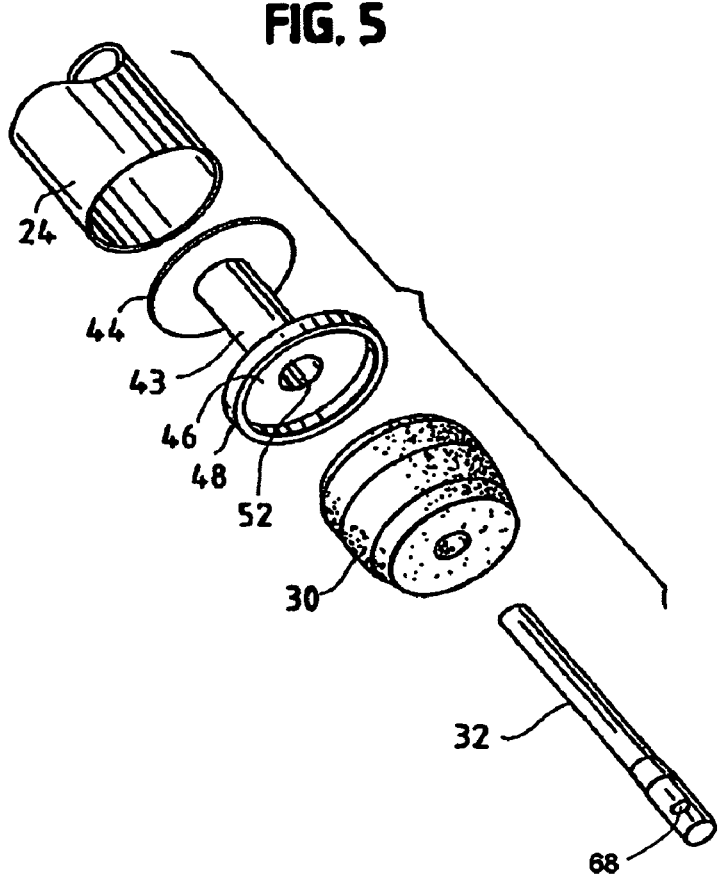
FIG. 5 is a exploded perspective view of the seat stay and shock absorber assembly of the invention.
Figure 6:
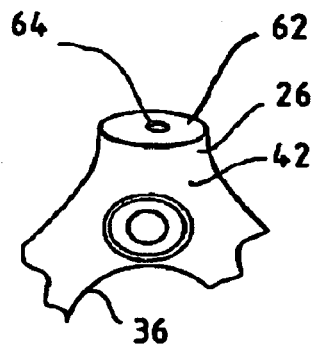
FIG. 6 is a perspective view of the brake bridge.

A bicycle frame 10 of the well known diamond configuration has head tube, down tube, top tube, and a rear triangle 12 generally made up of a seat tube 14, a chainstay assembly 16 and a seatstay assembly 18. A shock absorber assembly 20 operates in conjunction with the other elements of the rear triangle 12 to provide an ultra lightweight, high efficiency bicycle suspension. The shock absorber assembly is generally identified by reference number 20, while its components are separately described below.

The invention is adaptable to various tubular section chainstay assemblies. Thus, in an aluminum frame, the lateral width of a cross section of the chainstays is approximately equal to or slightly greater than the vertical height of a cross section of the chainstays. While in a carbon fiber reinforced plastic frame, the height appears to be significantly greater than the width.

The shock absorber assembly 20 is incorporated into the wishbone 22 of the seat stay assembly 18 as part of the bicycle frame 10. The shock absorber assembly 20 is mounted between a upper wishbone tube 24 connected to the seat tube 14, and a lower wishbone tube 26.

The limited amount of suspension travel is effected by in-plane flexure of the bicycle frame 10 itself and compression and extension of a bumper 30 preferably formed of a lightweight high energy storage cellular polyurethane elastomer. The preferred material is called Elastocell and is produced by BASF.

The out-of-plane deflection of the bicycle frame 10 is controlled by a light weight sliding shaft 32 rigidly attached to the wishbone tube 26. Shaft 32 slides in anti-friction bearing assembly 34.

Wishbone 22 further has a lower portion 36 which has two projecting tubes 38 projecting downwardly from brake bridge 42. Tubes 38 in turn directly connect to seat stays 54 and 56. Variations on these components can exist consistent with the invention. For example, brake bridge 42, tubes 38, lower portion 26 could all be molded from a fiber reinforced plastic. Alternatively, a cast metal brake bridge could have tubes 26, 38 formed as a unitary portion or could have separate tubes. As another example, all or a portion of lower portion 36 could be fabricated from metal such as by welding tubes.

In practice, adapting in one embodiment of brake components, for example, the brake will have a short 6 mm threaded stud protruding from the back of the brake (towards the front of the bike in the case of the rear brake) for mounting purposes. In standard frames, with straight seat stays and a small diameter brake bridge connecting the two seat stays, a short allen head recessed nut is used to engage and secure the 6 mm threaded stud. In the case of the wishbone style of seat stays, the brake bridge has additional thickness, and a longer recessed nut is needed to secure the brake. This nut is additionally used to secure the sliding shaft member 32 in the invention.

The invention is preferably closely coupled to the brake bridge. While the drawings show an extension of the wishbone above the brake bridge, this could be substantially eliminated because the invention is that it can be made quite short. This is particularly desirable where the suspension is to be used in smaller frames where the upper portion of the wishbone is very short, and places where there is not room for a conventional shock.

Shaft 32 passes through the center of the elastomeric bumper 30 and then shaft 32 slides in a suitable anti-friction bearing assembly 34 located in the upper wishbone tube 24.

The shaft 32 is hollow in the preferred configuration, and the bearing assembly 34 is elongated along the axis of the upper wishbone tube 24.

Bearing assembly 34 has a central cylinder 43 on which is formed, at a top end, a top flange 44 and at a bottom end, a bottom flange 46. Bottom flange 46 further has a small circumferential lip 48 which traps one or more edges of the elastomer bumper 30 of shock absorber assembly 20.

Anti-friction bearing assembly 34 is fanned or mounted in cylinder 24. Preferably a top and bottom sleeve hearings 50, 52 inside cylinder 24 enable maximum stability for shaft 32 while minimizing weight and complexity in assembly 34. Thus, a pair of hearings 50, 52 maintains the most effective axial alignment of the upper wishbone section with the lower seat stays and brake bridge 42. The sliding bearing is preferably an elongated bearing, with an axial length at least 3 times the inner diameter of the bearing.

The anti-friction bearings 50, 52 are held in plane by means of a relatively large diameter but thin wall and thus light weight tube 24. This provides adequate lateral rigidity to keep the bicycle wheel in vertical alignment with the front of the frame 10 in conjunction with the aforementioned sliding shaft 32 and bearings 50, 52 and with adequate fore-aft rigidity to resist excessive deflection and vibration of the lower seat stays 54, 56 and brake bridge 42 when the rear brake is applied in order to decelerate the bike.

There is sufficient angular flexibility in the combination of the seat tube 14, the seat stay assembly 18, and the chainstay assembly 16 to allow the bearings 50 and 52 to slide on shaft 32 without binding. The greatest angular flexibility is in the seatstay assembly 18 as the tubes 54 and 56 are smaller diameter and lighter weight than the tubes in the other assemblies.

The elastomeric bumper 30 is held in position radially by the sliding shaft 32 going through its hollow center, and in the preferred configuration, additionally by the circumferential lip 48 which traps one or more edges of the elastomeric bumper 30. Bumper 30 has its top stepped to fit into the space defined by lip 48, a small cylindrical center portion, and two conical segment portions reducing the diameter to the diameter of tube 26. Alternatively, the elastomeric bumper 30 can be retained in position by a matching pattern such as V grooves or channels in the frame and in the elastomeric bumper 30.

The chainstays 58, 60 of the bike are also of relatively large diameter construction in order to provide good torsional and lateral rigidity to the frame while allowing sufficient movement for the suspension to operate effectively.

In order for a suspension to operate smoothly, it needs both a compression spring means to store energy from bumps and return it, and a negative spring which keeps the unit from topping out harshly when all of the load is released from the wheel, as in when the bike is airborne. These two spring means oppose each other, and achieve a balanced position when there is no weight on the suspension, and a different balanced position with weight applied.

The invention uses the frame 10 of the bicycle as the negative spring when the bike is unloaded. Most of the spring action is due to flexure of the chainstays 58, 60 of the bike, but there is some deflection in some of the other tubes of the bike as well. With the normal rider's weight static on the bike, the frame is still providing a small amount of negative spring force. But when the rider hits a bump, and the chainstays 58, 60 travel further upward, the frame goes past its neutral position and begins to act as a positive spring, reinforcing the elastomeric bumper 30.

This is a key element of the invention. The preferred configuration is a frame made from high strength aluminum alloy or composite fiber (such as U.S. Pat. No. 6,270,104, incorporated by reference as if fully set forth herein) for light weight and high performance. While there are slight visual differences in drawings showing these alternatives, the operation of the shock absorber assembly 20 in conjunction with these tubular frames is the same in either tubular frame.

Other frame designers have said that aluminum could not be used for this type of design, because of its poor fatigue strength. If the aluminum frame were made as laterally and torsionally stiff as a racer would like, and the total suspension travel was in one direction, upward, from the unloaded position of the frame, then the amount of travel which would not cause frame fatigue would probably be limited to a small, and possibly not as useful amount as the present invention. Further, the advantageous strength, stiffness and weight properties of hollow tubes can be utilized in the entire frame, including the bottom bracket and chainstay assembly 16.

By using essentially a standard, high quality racing frame as the basis, with the addition of the suspension parts described, the rear suspension can add as little as about 65 grams (2.3 oz) to the weight of the bike. Sample frames (not including the front fork or steering bearings) including the complete suspension weigh less than 3 pounds, or 1.5 kilograms. This was in primarily aluminum structure frames. The total weight would likely be even less in a carbon fiber composite frame. This is much lighter than prior art designs.

The relative dimensions of such a standard frame adapted to receive the shock absorber 20 illustrate the efficiency of this shock absorber arrangement. A gap of about 25 mm separates tube 24 and tube 26 when the bicycle frame is fully assembled with all the tubes in the normal orientation and with the normal structure. Tube 24 is fully hollow and receives bearing assembly 34. Tube 26 is closed with a disk 62 formed over its end. An aperture 64 receives shaft 32.

Installation of assembly 20 in frame 10 is temporarily aided by the use of bolt 66. Bolt 66 fits a threaded end of shaft 32 to provide, effectively a handle and a guide so that assembly 20 can be fitted in tube 24 and shaft 32 can be aligned in portion 22. Once assembled, a standard brake binder stud and nut pass through brake bridge 42 and also through a transverse bore in the base of shaft 32. Fixing the brake in place, therefore, fixes assembly 32 in place with no additional fasteners.

An added structural advantage is the placement of a transverse bore in shaft 32 which receives a standard brake binder bolt, the transverse placement of which provides great strength utilizing a component that would be present in any bicycle frame, thereby further improving performance relative to strength and weight. This therefore provides a performance advantage when compared to a suspension placing a shaft on the top portion of the wishbone proximate the seat tube.

The dimension of elastomeric bumper 30, uninstalled, and at rest is about 30 mm. Assembly 20 is fit in the gap by flexing chainstays 58, 60 downward, to enable an increase in the gap. Upon fitting assembly 20 in place and bolting shaft 32 through brake bridge 42, tension on chainstays 58, 60 is partially released and partial compression or preload is applied on bumper 30. This has the effect of enabling the negative springing by chainstays 58, 60 as ride conditions impose a reduced load on bumper 30—for example after a rider passes a bump in a road surface.

While the present invention has been disclosed and described with reference to two alternative embodiments thereof, it will be apparent, as noted above that variations and modifications may be made therein. It is also noted that the present invention is independent of the specific tubular frame, and is not limited to the particular frame. It is, thus, intended in the following claims to cover each variation and modification that falls within the true spirit and scope of the present invention.

The invention claimed is:

1. A bicycle frame weighing less than 1.5 Kilograms including an integrated rear shock absorbing assembly, said frame formed as a diamond bicycle frame structure, interconnected head tube, down tube, top tube, seat tube, first and second tubular chainstays, first and second seat stays, a brake bridge at a top of said seat stays connecting said seat stays to one another, and a bottom bracket assembly interconnecting chainstays, down tube and seat tube;
  said first chainstay being fixedly connected to said first seat stay by a first dropout said;
  second chainstay being fixedly connected to said second seat stay by a second dropout;
  at least one elastomer shock absorbing spring member is attached to said brake bridge, and a wishbone attached between the said elastomer and an upper portion of said seat tube, said chainstays being connected to said bottom bracket assembly in an unpivoted manner;

at least one sliding bearing located so as to be contained within a portion of said wishbone and at least one shaft attached to the brake bridge and engaging the sliding bearing, with the sliding bearing being an elongated bearing, with an axial length at least 3 times a diameter of the bearing.

2. The frame of claim 1 with the shaft being retained in the brake bridge by means of a brake bolt and nut.

3. The frame of claim 1 with said sliding bearing located in the brake bridge and said shaft attached to said wishbone and engaging the sliding bearing.

4. The frame of claim 3 where the shaft goes through the elastomer.

5. The frame of claim 3 where the shaft is a light weight hollow section.

6. The frame of claim 1 where the elastomer spring is partially compressed by tension in the bicycle frame.

7. The frame of claim 6 where the partial compression of the elastomer helps to retain said elastomer in place.

8. The frame of claim 6 with said sliding bearing located in an upper portion of said wishbone and said shaft attached to the brake bridge and engaging the sliding bearing.

9. The frame of claim 8 where the shaft goes through the elastomer.

10. The frame of claim 8 with the shaft being a light weight hollow section.

11. The frame of claim 6 with said sliding bearing located in the brake bridge and said shaft attached to the wishbone and engaging the sliding bearing.

12. The frame of claim 11 where the shaft goes through the elastomer.

13. The frame of claim 11 where the shaft is a light weight hollow section.

14. A bicycle frame weighing less than 1.5 Kilograms including an integrated rear shock absorbing assembly, said frame formed as a diamond bicycle frame structure, interconnected head tube, down tube, top tube, seat tube, first and second tubular chainstays, first and second seat stays, a brake bridge at a top of said seat stays connecting said seat stays to one another, and a bottom bracket assembly interconnecting chainstays, down tube and seat tube;
  said first chainstay being fixedly connected to said first seat stay by a first dropout said;
  second chainstay being fixedly connected to said second seat stay by a second dropout;
  at least one elastomer shock absorbing spring member is attached to said brake bridge, and a wishbone attached between the said, elastomer and an upper portion of said seat tube, said chainstays being connected to said bottom bracket assembly in an unpivoted manner;
  where the elastomer spring is partially compressed by tension in the bicycle frame;
  with a sliding bearing located in the an upper portion of said wishbone and a shaft attached to the brake bridge and engaging the sliding bearing;
  with said sliding bearing being an elongated bearing, with an axial length at least 3 times a diameter of the hearing.

15. The frame of claim 14 with the shaft being retained in the brake bridge by means of a brake bolt and nut.

16. A bicycle frame including an integrated rear shock absorbing assembly, said frame comprised of a typical bicycle frame structure, composed of head tube, down tube, top tube, seat tube, first and second chainstays, first and second seat stays, brake bridge at a top of said seat stays connecting said seat stays to one another, at least one elastomer shock absorbing spring member attached adjacent said brake bridge, and an upper wishbone attached between the said elastomer and an upper portion of said seat tube, a first dropout fixedly interconnecting said first chainstay to said first seat stay, and a second dropout fixedly interconnecting said second chainstay to said second seat stay, at least one sliding bearing located in a lower portion of said upper wishbone, at least one sliding shaft attached to said brake bridge slidably engaging said beating, a brake nut threadably engaging and retaining a rear brake, said brake nut engaging and assisting in retaining the said sliding shaft.

17. The frame of claim 16 where the shaft passes through at least a portion of the elastomer and assists to retain said elastomer in place.

18. The frame of claim 16 where partial compression of the elastomer assists to retain said elastomer in place.

19. A suspension for a tubular diamond configuration bicycle frame having a rear triangle with a seatstay assembly and a tubular chainstay comprising:
  said seatstay assembly is separated into an upper portion and a lower portion;
  a shock absorber assembly interconnecting said upper portion and said lower portion;
  said shock absorber assembly being preloaded by compressive loads in said frame acting on said upper portion and said lower portion;
  said shock absorber having an elastomeric bumper;
  said elastomeric bumper being normally compressed between a bearing assembly and a flat surface associated with one of said upper or lower portions;
  said bearing assembly having a top flange and a bottom flange separated by d central cylinder;
  said top flange and bottom flange fining internally in one of said upper portion or said lower portion to form a bearing mounted portion, and the other of said upper or lower portions, without said flanges, being a shaft receivable portion;
  a shaft mounted to said shaft receivable portion;
  said shaft slidably fitting within said central cylinder so that an axis of the shaft and the axis of said cylinder are the same, and said shaft sliding within said cylinder to permit said frame to flex in a direction substantially parallel to said cylinder axis, and said bumper to compress in a direction substantially parallel to said cylinder axis, while frame flexing in a direction having an angular component relative to said cylinder axis is resisted.

* * * * *